United States Patent Office 3,137,626

Patented June 16, 1964

1

3,137,626

PLANT ANTIVIRAL COMPOSITIONS AND METHODS FOR PREPARING THE SAME

Frank Robert Koniuszy, Rahway, Edward Anthony Kaczka, Union, and Robert Ayden Long, East Brunswick, N.J., and Reed Alden Gray, Cupertino, Calif., assignors to Merck & Co., Inc., Rahway, N.J., a corporation of New Jersey Filed Nov. 3, 1960, Ser. No. 67,132

10 Claims. (Cl. 167—65)

This invention relates generally to plant antiviral substances and, more particularly, to a new and useful plant antiviral substance which we have designated cytovirin, and the process for preparing the same by cultivation under particular controlled conditions of new strains of the microorganism *Streptomyces olivochromogenus.*

This application is a continuation-in-part of our pending application, Serial Number 669,916, filed July 5, 1957, new abandoned.

Generally, antibiotics that are known to possess antibacterial or antifungal activity have not been effective against plant virus diseases. This novel compound, cytovirin, possesses antiviral activity and has proved to be the most potent agent encountered as yet for combatting local lesion and systemic plant virus infections.

It has now been discovered, according to the present invention, that upon cultivation of these new strains of the microorganism in a suitable nutrient medium a new substance can be isolated from the resulting culture broth, cytovirin, which possesses antibacterial and antifungal activity against plant virus diseases.

The new microorganism which produces cytovirin is a brown pigment-producing saprophytic streptomycete. In morphological characteristics it most closely resembles *Streptomyces olivochromogenus.* It differs, however, in physiological characteristics from any previously described strain of *Streptomyces olivochromogenus* and, in fact, from any previously described brown pigment-producing saprophytic streptomycete. It fails to liquefy gelatin and fails to coagulate milk, whereas the brown pigment-producing streptomycetes previously described are all highly proteolytic. It also produces the antiviral agent, cytovirin, which has not been previously described as being produced from any *Streptomyces olivochromogenus.*

Because of this close morphological relationship with *Streptomyces olivochromogenus,* the new culture has been classified as a member of the species *Streptomyces olivochromogenus*; but because of its physiological distinctions it has been given a specific designation, var. *cytovirinus.* A viable culture of this cytovirin-producing organism has been deposited in and added to the permanent culture collection of the American Type Culture Collection at Washington, D.C., identified as ATCC No. 12791. It will be understood that cytovirin may be produced also by mutants of this organism such as may be obtained by natural selection, and by use of a mutating agent such as ultraviolet or X-ray irradiation, nitrogen mustards, and the like.

This new plant antiviral, cytovirin, is comprised of the elements carbon, hydrogen, nitrogen and oxygen. These elements are combined in a substance which has a molecular weight of about 422 and the empirical formula of $C_{17}H_{24-28}N_aO_5$. Cytosine having the empirical formula of $C_4H_5N_3O$ is one of the acid degradation products of cytovirin. Another acid degradation product of cytovirin is an amino acid having an empirical formula of $$C_7H_{16}N_4O_2 \cdot 2HCl$$

Cytoviridine, having the approximate empirical formula of $C_{10}H_{10-14}N_4O_4$, is a basic degradation product of cytovirin. Cytovirin is soluble in water and in alkaline re-

2 agents, such as aqueous solutions of alkali metal hydroxides, and in aqueous and methanolic solutions of mineral acid. It has base-binding groups and can form salts with various acids, e.g., hydrochloric, sulfuric and picric acids. It is soluble in the lower acidified alkanols and acetic acid. It is sparingly soluble in ether, benzene, chloroform and carbon tetrachloride.

Substantially pure cytovirin has been obtained in crystalline form darkening at about 225° C. and melting at about 245–250° C. with decomposition.

Alkaline aqueous solutions of cytovirin and mineral oil suspensions of the pure base form of cytovirin exhibit characteristic absorption, the former in the ultarviolet and the latter in the infrared portions of the radiation spectrum. A solution of substantially pure cytovirin in 0.01 N aqueous sodium hydroxide exhibits a characteristic ultaviolet absorption peak at about 2680 A. This absorption peak is indicative of a substantially pure matter having a specific absorbency of about $$E^{1\%}_{1\,cm.}\ 200$$

A solution of pure cytovirin in 0.01 N hydrochloric acid exhibits a characteristic ultraviolet absorption peak at about 2750 A. of about $$E^{1\%}_{1\,cm.}\ 300$$

A mineral oil suspension of substantially pure cytovirin exhibits characteristic infrared absorption peaks at the following wavelengths, expressed in microns:

| | |
|---|---|
| 2.95–3.2μ | 8.10 |
| 5.93 (shoulder) | 8.32 |
| 6.01 | 8.41 |
| 6.18 | 8.85 |
| 6.36 | 9.22 |
| 6.51 | 9.50 (shoulder) |
| 6.68 | 9.98 |
| 7.04 | 10.51 |
| 7.16 | 10.78 (shoulder) |
| 7.39 | 11.50 |
| 7.69 | 12.02 |
| 7.77 | 12.60 |
| 7.83 | |

FIGURE 1 is a photograph of a graph of the infrared spectrum described above. This figure is further referred to in Example 1.

A mixture of crude cytovirin polyhydrochloride salts was characterized by its ultraviolet absorption spectrum which showed a maximum ca.

$$275\ m\mu,\ E^{1\%}_{1\,cm.}\ 158$$

and a minimum ca.

$$240\ m\mu,\ E^{1\%}_{1\,cm.}\ 28$$

in an acid solution. In alkaline solution the maximum was about $$268\ m\mu,\ E^{1\%}_{1\,cm.}\ 116$$

and a minimum ca.

$$250\ m\mu,\ E^{1\%}_{1\,cm.}\ 91$$

Crude cytovirin monohydrochloride in crystalline form has been obtained, these crystals darkened at about 210° C. and melting with decomposition at about 220°–222° C.

The optical rotation of this crude cytovirin monohydrochloride is about +82 (in water). This crude cytovirin monohydrochloride was characterized by its ultraviolet absorption spectrum which showed a maximum at about $$275\ m\mu,\ E^{1\%}_{1\,cm.}$$

about 230° C. in acid solution.

Substantially pure cytovirin monohydrochloride was also prepared and is optically active, $[\alpha]_D^{23} = +85°$ (c., 0.077 in water), $[\alpha]_D^{23} = +40°$ (c., 0.071 in dilute hydrochloric acid) and $[\alpha]_D^{23} = +82°$ (c., 0.058 in about pH 10-11 solution).

Potentiometric titrations of substantially pure cytovirin monohydrochloride in water with lithium hydroxide gave an equivalent weight of about 456, pH$_1$ ½ =4.3 and pH$_2$ ½ =7.9. The ultraviolet spectrum of an approximately pH 2 solution showed one maximum at about 275 m$\mu$, $E_{1\,cm.}^{1\%}$ 304 and a minimum at about 240 m$\mu$, $E_{1\,cm.}^{1\%}$ 41

A mineral oil suspension of pure cytovirin monohydrochloride exhibits characteristic peaks at the following wavelengths, expressed in microns:

| | |
|---|---|
| 3.04$\mu$ (shoulder) | 8.88 |
| 3.18 | 9.26 |
| 5.98–6.04 | 9.50 |
| 6.18 | 9.80 (shoulder) |
| 6.28 | 10.10 |
| 6.52 | 10.46 |
| 7.76 | 11.50 |
| 8.11 | 12.08 |
| 8.34 | 12.59 |
| 8.64 | 12.82 |

Figure 2:
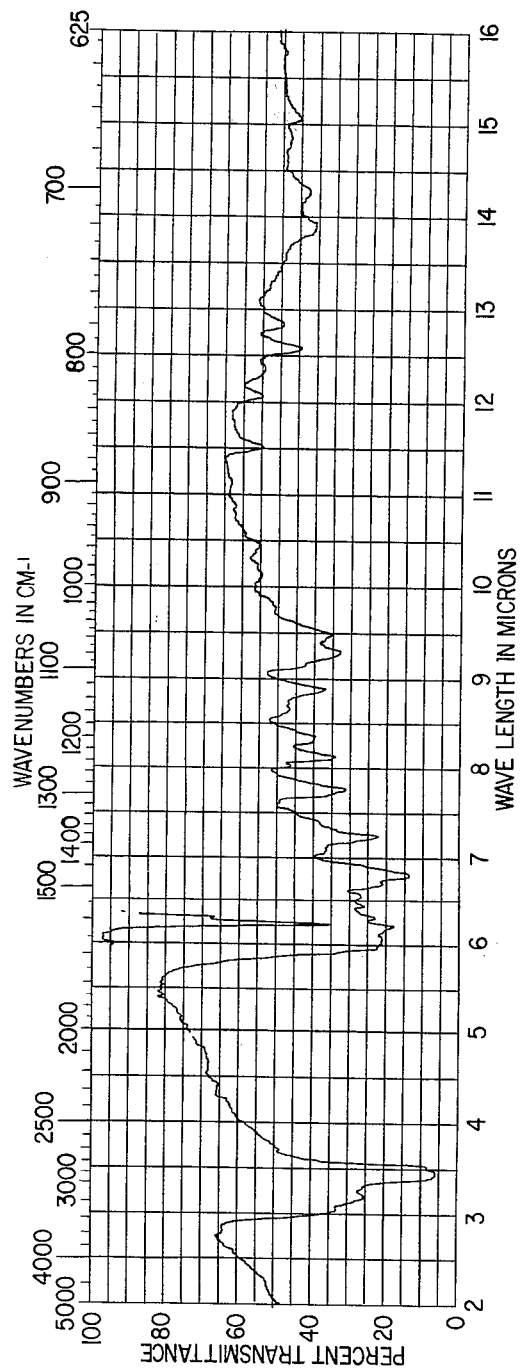

FIGURE 2 is a photograph of a graph of the infrared spectrum mentioned above. This figure is further referred to in Example 1.

Regarded in certain of its broader aspects, the novelty in the present invention comprises the antibiotic cytovirin and its salts and in the process for preparing the same by cultivating strains of *Streptomyces olivochromogenus* var. *cytovirinus*, under stationary or submerged aerobic (viz., submerged growth with agitation and aeration) conditions, in a medium containing nutrients of the type present in meat extract, soybean meal, corn steep liquor, distillers' solubles, etc., growth from the culture broth, treating the culture broth with a resin or alumina to adsorb the active product, eluting the adsorbate with a suitable eluting agent and recovering cytovirin from the eluate.

For the preparation of cytovirin, a culture medium is used comprising an aqueous solution containing approximately 2.0% of carbohydrate such as dextrose or glucose, .25% of inorganic salts such as sodium chloride, and a small amount of a nitrogen source suitable for satisfactory elaboration of the active product. Suitable nitrogen nutrients are such materials as meat extract, soybean meal and the like.

This medium is distributed in appropriate vessels of a depth of 1–2 inches for surface cultivation. For submerged aerobic cultivation, it is placed in deep tanks having a suitable means for aeration and agitation of the medium. The medium thus distributed is sterilized at 15 pounds of steam pressure for about 15 minutes and then cooled. For inoculation of the culture medium, a heavy water suspension of spores of a strain of *Streptomyces olivochromogenus* var. *cytovirinus* is prepared by scraping from agar slants or by first growing the organism under submerged aerobic conditions to obtain a heavy mass of growth. Incubation takes place at a temperature of about 22° to 28° C. Elaboration of the cytovirin is usually complete in 96 hours when cultivation is under submerged aerobic conditions.

The culture broth obtained by either submerged aerobic or stationary cultivation of *Streptomyces olivochromogenus* var. *cytovirinus* is filtered or centrifuged to separate solids such as the propagating organism, numerous metabolic products of fermentation and residual food substances from the liquid which contains cytovirin and a number of soluble impurities. It has been found that cytovirin may be recovered from the filtered broth with surprising efficiency and facility by means of ion-exchange resins. Ion-exchange resins have heretofore been described in the literature. In general, they are formed either by condensing a phenol and an aldehyde, one of which contains a carboxyl group, particularly resorcylic acid and formaldehyde, or by the copolymerization of a polymerizable acid with a divinyl compound, i.e., a compound having two $CH_2=CH_2$ groups such as, for example, acrylic or methacrylic acid and divinyl benzene. Resins of this type are described in U.S. Patents Nos. 2,319,359; 2,333,754; 2,340,110; 2,340,111 and others are characterized by the common quality of having their ion-exchange ability dependent upon carboxylic groups in the resin molecule.

For the adsorption of cytovirin the resin may be in the form of the ammonium salt or sodium salt, for these salts are economical to use and are nontoxic.

The fermentation broth containing cytovirin is brought directly into contact with the carboxylic acid type ion-exchange resin. Alternatively, the broth can be contacted with the resin after such steps as filtering and adjusting the pH as may be necessary or desirable. This is preferably accomplished by passing the broth through one or more columns of the resin. After water is passed through the column to remove residual broth, the adsorbed cytovirin is recovered by passing through the column an aqueous solution of an electrolyte. Suitable elution agents include ammonium hydroxide, aqueous solutions of inorganic acids such as hydrochloric acid, hydrobromic phosphoric and organic acids such as acetic acid, picric acid, oxalic acid, benzoic acid and the like.

The eluate containing cytovirin in the form of the salt which is determined by the eluting agent employed such as cytovirin hydrochloride where aqueous hydrochloric acid was the eluting agent is active against a number of plant virus diseases as described hereinafter and can be used for this purpose without further purification. However, if further purification appears advisable, the eluate containing the cytovirin can be evaporated to dryness. By repeated trituration of the resulting residue with methanol and evaporation to dryness, the inorganic salts are separated and cytovirin monohydrochloride is recovered. This cytovirin monohydrochloride has been tested for antiviral plant activity and has been found to be active.

The cytovirin monohydrochloride is converted to the free base cytovirin by dissolving the cytovirin monohydrochloride in sodium hydroxide, whereupon the free base cytovirin separates from solution. The cytovirin thus obtained possesses antiviral plant activity.

In accordance with an alternative procedure, the fermentation broth containing cytovirin, after such steps as filtering and adjusting the pH as may be necessary or desirable, is brought into contact with alumina. This is preferably accomplished by passing the broth through one or more columns of the alumina. After methanol is passed through the column to remove residual broth, the adsorbed cytovirin is recovered by passing water through the column. Concentration of the aqueous eluate yields a white crude cytovirin. Purification of this crude cytovirin product may be accomplished by dissolving the crude cytovirin in water and adding picric acid, whereupon cytovirin picrate crystallizes from solution. The cytovirin picrate can be treated with hydrochloric acid and cytovirin polyhydrochloride obtained. The polyhydrochloride salts of cytovirin can be converted to cytovirin monohydrochloride and to the free base cytovirin as described in Example 1.

As still another procedure, the fermentation broth containing cytovirin can be freeze-dried or spray-dried and used directly for a crude plant antiviral.

The antiviral cytovirin can be applied to the leaves of diseased plants in aqueous solution in from 0.5 percent to 100 percent purity. Inert diluents can be added to the pure product, and wetting agents may be incorporated in the mixture. In addition, the impure eluates obtained by elution of the alumina or resin may be applied directly.

To assure a more complete understanding of the subject matter of this invention and of how the methods and processes in accordance therewith best may be practiced, certain presently preferred embodiments of this invention will now be described, it being clearly understood that these specific examples are provided by way of illustration, merely, and not by way of limitation upon the invention defined in the self-joined claims.

EXAMPLE 1

*Growth of* Streptomyces Olivochromogenus *var.* Cytovirinus *ATCC 12791*

An inoculum medium is prepared having the following composition:

| | Grams per liter |
|---|---|
| Casein hydrolyzate | 10.0 |
| Beef extract | 3.0 |
| Sodium chloride | 5.0 |
| Dextrose | 10.0 |

Fifty cc. of the above medium is distributed in appropriate vessels, sterilized at 15 pounds' pressure for 15 minutes, and then cooled. The medium in each vessel is then inoculated with a heavy aqueous suspension of the growth on a slant of the strain *Streptomyces olivochromogenus* var. *cytovirinus* ATCC. 12791, and the inoculated media are maintained at an incubation temperature of 28° C. for 48 hours on a rotary shaker.

A production medium then is prepared having the following composition:

| | Grams per liter |
|---|---|
| Soybean meal | 30.0 |
| Distillers' solubles | 7.5 |
| Sodium chloride | 2.5 |
| Dextrose | 20.0 |

One hundred fifty cc. of this medium is distributed in appropriate vessels, sterilized at 15 pounds' pressure for 15 minutes and then cooled. The pH of this media is 7.2 before sterilization.

This medium is then inoculated with 5 cc. of the above inoculum and the inoculated media are maintained at an incubation temperature of 28° C. for 96 hours on a rotary shaker.

In place of soybean meal in the above production medium, the following materials have been substituted:

Synthetic lactate medium—described by Selman A. Waksman in Actinomycetes; Their Nature, Occurrences, and Importance; Waltham, Mass., Chronica Botanica Company, 1950.
3% corn steep liquor
7% distillers' solubles
Glycerol
Starch
Wheat bran
Rye meal
Peanut meal
Casein hydrolyzate The culture grew in all the above media and showed activity against various plant viruses as described hereinafter.

*Treatment of Broth With Resin and Recovery of Cytovirin Monohydrochloride*

Three hundred ml. of solution containing 50 g. of lyophilized cytovirin filtered broth was passed through a column containing about 1 liter of an aliphatic carboxylic ion-exchange resin on the ammonium cycle. The resin was washed with water, and then the cytovirin was eluted with dilute hydrochloric acid. The eluates were evaporated to dryness in vacuo, and cytovirin polyhydrochloride were separated from ammonium chloride by trituration of the residue with methanol, evaporation of the methanol solution to dryness, etc., repeating the triturations and evaporations until all or nearly all inorganic salts are separated. Cytovirin monohydrochloride was precipitated in crystalline form from methanol solution by the addition of pyridine. Yield—265 mg. The resin process was repeated using the resin on the sodium cycle. Desalting was carried out in the same manner as the preceding experiment, and crystalline cytovirin monohydrochloride was obtained.

The ultraviolet absorption spectrum of a ca. pH 2 solution showed one maxima at about $$275 \text{ m}\mu, E_{1 \text{ cm.}}^{1\%} \text{ } 304$$

Potentiometric titration gave an equivalent weight of ca. 456, $pH_1$ ½=4.3, and $pH_2$ ½=7.9.

Cytovirin monohydrochloride $[\alpha]_D^{23}+85$ (c., 0.077 in water); $[\alpha]_D^{23}+40$ [c., 0.071 in dilute hydrochloric acid]; $[\alpha]_D^{23}+82$ [c., 0.058 in ca. pH 10–11 solution].

Cytovirin monohydrochloride is characterized in the infrared by the following bands (examined as Nujol mulls):

| | |
|---|---|
| 3.04μ (shoulder) | 8.88 |
| 3.18 | 9.26 |
| 5.98–6.04 | 9.50 |
| 6.18 | 9.80 (shoulder) |
| 6.28 | 10.10 |
| 6.52 | 10.46 |
| 7.76 | 11.50 |
| 8.11 | 12.08 |
| 8.34 | 12.59 |
| 8.64 | 12.82 |

This infrared spectrum is graphically illustrated in FIGURE 2.

*Conversion of Cytovirin Monohydrochloride to Cytovirin Free Base*

One gram of cytovirin monohydrochloride obtained as above was dissolved in about 10 ml. of about 0.5 N sodium hydroxide. Crystalline cytovirin began to crystallize in the solution after about 15 minutes. The free base was separated, washed with cold water and dried. Cytovirin was recrystallized from water (M.P. darkens at about 225° C. and melts with decomposition at about 245–250° C.).

Cytovirin is composed of C, H, N and O atoms. It has a molecular weight of approximately 422 and the empirical formula $C_{17}H_{24-8}N_8O_5$. The cytosine portion of the molecule is responsible for the ultraviolet absorption band at 275 mμ in acid solution and 268 mμ band in alkaline solution as described herein below.

Cytovirin is soluble in water and in alkaline reagents, such as aqueous solutions of alkaline metal hydroxides, and in aqueous and methanolic solutions of mineral acids. It has base-binding groups and can form salts with various acids, e.g., hydrochloric, sulfuric and picric acids. It is soluble in the lower acidified alkanols and acetic acid. It is sparingly soluble in ether, benzene, chloroform and carbon tetrachloride.

*Ultraviolet Absorption Spectrum*

A solution of substantially pure cytovirin in 0.01 N aqueous sodium hydroxide exhibited a characteristic ultraviolet absorption peak at about 2680 A. This absorption peak, having a specific absorbency of about $$E_{1 \text{ cm.}}^{1\%} \text{ } 200$$

is indicative of a substantially pure material. A solution of pure cytovirin in 0.01 N hydrochloric acid exhibits a characteristic ultraviolet absorption peak at about 2750 A. about $$(E_{1 \text{ cm.}}^{1\%} \text{ } 304)$$

This absorption is due to the presence of cytosine in the molecule.

*Infrared Absorption Spectrum (Spectra Examined as Solid Mulls in Nujol)*

Cytovirin free base is characterized in the infrared by the following bands (examined as Nujol mulls):

| | |
|---|---|
| 2.95–3.2$\mu$ | 7.83 |
| 5.93 (shoulder) | 8.10 |
| 6.01 | 8.32 |
| 6.18 | 8.41 |
| 6.36 | 8.85 |
| 6.51 | 9.22 |
| 6.68 | 9.50 (shoulder) |
| 7.04 | 9.98 |
| 7.16 | 10.51 |
| 7.39 | 10.78 (shoulder) |
| 7.69 | 11.50 |
| 7.77 | 12.02 |

Figure 1:
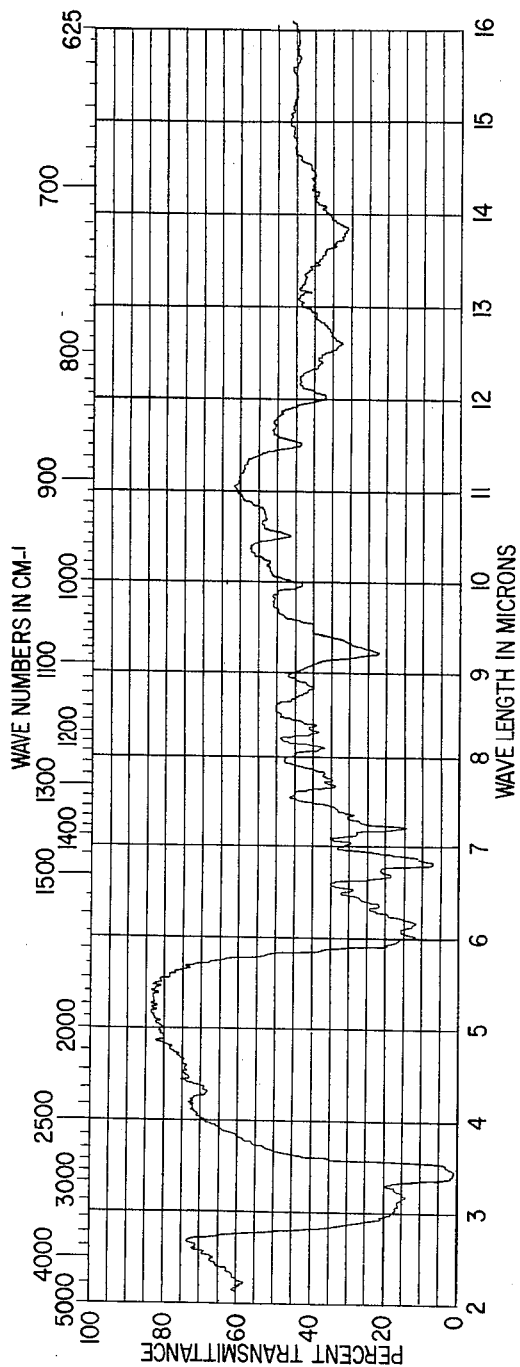

This infrared spectrum is graphically illustrated in FIGURE 1.

Cytovirin obtained as above can be dissolved in water and one or more equivalents of any inorganic or organic acid can be added to obtain correspondingly the mono or poly acid salts. Such salts as cytovirin sulfate, cytovirin hydrobromide, cytovirin phosphate; organic salts such as cytovirin acetate, cytovirin formate, cytovirin oxalate and cytovirin benzoate are some of the cytovirin salts that can be obtained by this procedure.

EXAMPLE 2

*Treatment of Broth With Alumina and Elution of Crude Cytovirin*

A two-liter batch of broth containing cytovirin prepared as described in Example 1 was filtered, and the filtrate was concentrated in vacuo to 500 ml. volume. A total of 3600 g. of acid washed activated alumina was slurried with absolute methanol into a 4″ x 3′ column. This was followed by washing with 24 liters of methanol. Concetrationn of this wash yielded 11 g. of crude material containing coloring matter with a small amount of antiviral active material. The alumina column was eluted with 24 liters of water. Concentration of this aqueous eluate yielded 20.7 g. of white crude cytovirin.

*Conversion of Crude Cytovirin to Cytovirin Picrate*

Twenty grams of crude cytovirin obtained as described above was dissolved in 85 ml. of water. To this solution there was added 3 grams of picric acid in 250 ml. of water, and 900 mg. of crude cytovirin picrate was precipitated from solution and was recovered. This crude cytovirin picrate had a melting point of 185°–195° C. with decomposition.

*Conversion of Cytovirin Picrate to Cytovirin Polyhydrochloride and to Cytovirin Monohydrochloride*

The crude cytovirin picrate obtained as described above was suspended in water which had been acidified with dilute hydrochloric acid. The liberated picric acid was removed from the solution by repeated extraction with ether. After complete removal of picric acid, the aqueous solution was evaporated to dryness in vacuo leaving cytovirin polyhydrochloride in the residue.

Alternatively, impure or crude cytovirin picrate was converted to cytovirin polyhydrochloride by dissolving the cytovirin picrate in 25 ml. of methanol containing 1 ml. of 6 N hydrochloric acid and precipitating crude or impure cytovirin polyhydrochloride by the addition of ether. The crude cytovirin polyhydrochloride obtained as above were active against Southern Bean Mosaic virus at 0.2 p.p.m. This mixture of crude cytovirin polyhydrochloride was characterized by its ultraviolet absorption spectrum which showed a maximum at about 275 m$\mu$, $E^{1\%}_{1\,cm.}$ 158 and a minimum at about 240 m$\mu$, $E^{1\%}_{1\,cm.}$ 28 in acid solution. In alkaline solution the maximum was at about 268 m$\mu$, $E^{1\%}_{1\,cm.}$ 116 and a minimum at about 250 m$\mu$, $E^{1\%}_{1\,cm.}$ 91

436 mg. of the crude polyhydrochloride were extracted with 20 ml. of methanol. Upon adding 5 drops of pyridine to the methanol solution, crystalline cytovirin monohydrochloride precipitated. Repeated recrystallization from water by the addition of methanol gave cytovirin monohydrochloride of 99.5 percent purity as shown by solubility analysis.

The ultraviolet absorption spectrum of a solution having a pH of approximately 2 of the cytovirin monohydrochloride showed a maximum at 275 m$\mu$, $E^{1\%}_{1\,cm.}$ 304 and a minimum at about 240 m$\mu$, $E^{1\%}_{1\,cm.}$ 41 a solution having a pH of approximately 11 showed a maximum at about

268–270 m$\mu$, $E^{1\%}_{1\,cm.}$ 200 and a minimum at about 250 m$\mu$, $E^{1\%}_{1\,cm.}$ 140

Potentiometric titration gave an equivalent weight of 456 with a pH ½ of 4.3 and a pH ½ of 7.9. Potentiometric titration in 6 percent HCHO—H$_2$O gave an equivalent weight of 474 at a pH ½ of about 5.8.

The cytovirin monohydrochloride was found to be optically active with $[a]_D^{23}$ +85 (c., 0.077 in water); $[a]_D^{23}$ +40 (c., 0.071 in dilute hydrochloric acid); $[a]_D^{23}$ +82 (c., 0.058 in a solution having a pH of approximately 11).

In a similar experiment, 2 g. of starting material was used. Cytovirin picrate was converted to cytovirin polyhydrochloride as above, and a monohydrochloride (obtained by treating an aqueous solution of the polyhydrochloride with sodium bicarbonate solution) salt of cytovirin was obtained in crystalline form; melting point darkened at about 210° C. and melted with decomposition at ca. 220–222° C.; $[a]_D^{25}$ ca. +82 (in water); ca. pH 2 solution showed a maximum at ca.

275 m$\mu$, $E^{1\%}_{1\,cm.}$ ca. 230° C.

Crystalline cytovirin monohydrochloride obtained from cytovirin picrate were active as antivirals for plants at 0.1 p.p.m.

EXAMPLE 3

*Activity of Cytovirin Against Plant Viruses*

Pure crystalline cytovirin and impure concentrates of cytovirin were tested for activity against plant virus infections by the following two procedures:

(1) Local lesion infection, and
(2) Systemic virus infection.

*Activity of Crude Concentrates of Cytovirin on Local Lesion Infections of Plants*

Pinto bean plants were grown in rich garden soil contained in 3-inch pots in the greenhouse at 26° C. The plants were used at the stage when their first trifoliate leaves were just starting to appear. The two twin primary leaves of each plant were sprinkled with Carborundum and rubbed with a suspension of southern bean mosaic virus in water. Ten minutes later the leaves were washed with water and blotted dry. One hour after inoculation with the virus, one of the leaves was sprayed on both surfaces with the culture filtrate of cytovirin, and the other leaf was left untreated as a control. Another spray was applied 24 hours after the first. Four plants were used for each treatment. The lesions that developed on the treated and untreated leaves in 7 days were counted, and the percent reduction caused by the broth was calculated.

Using this local lesion test, it was found that the undiluted filtrate of cytovirin when grown in a 500-milliliter shake flask caused 82% reduction in the number of virus lesions the first time it was tested. Some injury of the treated leaves occurred, making it difficult to distinguish injured spots from virus lesions. A 5-liter fermentor batch of cytovirin broth diluted 1 to 3 with water caused 100% reduction in lesions with severe injury. Further dilutions were tested; and later on, the broth from a fermentor batch when diluted 1 to 1000 with water caused 100% reduction in virus lesions without causing toxicity. This was the most potent antiviral material that had been encountered in these tests. A dilution of the broth 1 to 1250 caused 92% reduction in the number of lesions that developed in one test. A batch of cytovirin produced in peanut oil medium when diluted 1 to 500 caused 58% reduction in virus lesions.

The cytovirin fermentation broth was subjected to several chemical fractionations. When the broth was passed through an alumina column, the active material was adsorbed on the alumina. When the alumina column was eluted with 70% methanol and then with water, the antiviral material was found in the water eluate fraction.

*Sample No. 1.*—Although the cytovirin water eluate fraction at a spray concentration of 5000 p.p.m. was toxic to the treated leaves, it was observed that the number of virus lesions on the opposite untreated primary leaves was greatly reduced. This showed that the antiviral material was translocated from one leaf to another in the plant. Further dilutions of the water eluate fraction from alumina were prepared and tested.

*Sample No. 2.*—A second sample of the water eluate fraction was prepared in the same manner and tested. The results obtained with these crude cytovirin samples in a number of local lesion tests against southern bean mosaic virus are shown in the following Table I.

TABLE I

| Crude Cytovirin Sample-Water Elute from Alumina | Spray Conc., p.p.m. | Ratio of Number of Lesions On Treated Leaves to Number On Untreated Leaves | Percent Reduction in Number of Lesions | Toxicity |
|---|---|---|---|---|
| Sample No. 1 | 2 | 0/93 | 100 | None. |
| Sprayed on lower surface of leaves only | 4 | 71/119 | 40 | Do. |
| Sprayed 1 day before inoculation | 4 | 3/74 | 96 | Do. |
| Sprayed 1 day after inoculation | 4 | 5/193 | 97 | Do. |
| Sprayed on both surfaces 1 hr. after inoculation | 2 | 30/362 | 92 | Do. |
| Sample No. 2 | 100 | 0/157 | 100 | Slight. |
| Do | 20 | 22/239 | 93 | Do. |
| Do | 10 | 18/80 | 78 | None. |
| Do | 4 | 53/246 | 78 | Do. |

The tests also showed that the crude cytovirin was effective in inhibiting virus lesion development when it was first applied one day before inoculation or one day after inoculation. It also reduced the number of lesions when the spray was applied only to the lower surface of the leaf but was more effective when applied to both surfaces.

*Activity of Crystalline Cytovirin on Local Lesion Infection of Plants*

Large fermentor batches were processed. The antiviral material was concentrated by adsorption on and elution from alumina and prepared in pure crystalline form by precipitation of cytovirin picrate and recrystallizing the cytovirin monohydrochloride. The crystalline cytovirin monohydrochloride was tested against local lesion production in the bean virus test and also against local lesion production by tobacco mosaic virus in *Nicotiana rustica* plants. In the latter test all the leaves of a plant were inoculated with tobacco mosaic virus, and half of each leaf was sprayed with the cytovirin solution. Results of these tests are shown in the following table:

TABLE II.—CRYSTALLINE CYTOVIRIN

| Crystalline Cytovirin Monohydrochloride Samples | Spray Conc., p.p.m. | Virus Lesion Ratio Treated/Untreated | Percent Reduction in Virus Lesions | Toxicity |
|---|---|---|---|---|
| Southern bean mosaic virus | 1.0 | 0/188 | 100 | Slight. |
| Do | 0.5 | 0/128 | 100 | Do. |
| Do | 0.5 | 21/202 | 90 | Do. |
| Tobacco mosaic virus | 0.5 | 1/263 | 100 | Do. |
| Do | 0.25 | 19/444 | 96 | None. |
| Do | 0.12 | 12/263 | 95 | Do. |

EXAMPLE 4

*Activity of Cytovirin Against Systemic Plant Viruses*

The usefulness of this invention is shown by the following examples where crude cytovirin and crystalline cytovirin have been used successfully to combat systemic virus infections in plants. Systemic virus infections rather than local lesion infections cause the large losses in agricultural crops. When one leaf of a plant that is susceptible to systemic infection is inoculated with the virus, the virus generally moves throughout the whole plant in one or two weeks and produces various symptoms such as leaf mottling, chlorosis, stunting, and in some cases, necrosis of the infected tissue. The systemic virus infections tested against were tobacco mosaic virus in White Burley tobacco plants, spotted wilt virus in Bonny Best tomato plants, and southern bean mosaic virus in stringless Green Refugee bean plants.

In these tests the third leaf from the top of each tomato and tobacco plant was inoculated with the appropriate virus when the plants were 8–10 inches tall. Some of the plants were sprayed with an aqueous solution of cytovirin one day before inoculation or sometime after inoculation and some of the plants remained untreated as controls. The plants were observed carefully at regular intervals to see if any systemic virus symptoms were developing and the results are recorded in the following experiments.

EXAMPLE 5

*Activity of Crude Concentrates of Cytovirin on Systemic Virus Infections in Plants*

In this experiment two sprays of crude cytovirin (water eluate from alumina) were applied to the plants after inoculation with the virus. The results are shown below:

RATIO OF NUMBER OF PLANTS SHOWING VIRUS SYMPTOMS TO NUMBER OF PLANTS IN TREATMENT

| Spray Treatments | Days After Inoculation | | | | | | Avg. Ht. of Plants 4 weeks, mm. |
|---|---|---|---|---|---|---|---|
| | 14 | 21 | 28 | 35 | 42 | 49 | |
| Tobacco mosaic virus in tobacco plants: | | | | | | | |
| 0 untreated controls | 7/7 | 7/7 | 7/7 | 7/7 | 7/7 | 7/7 | 414 |
| 100 p.p.m. crude cytovirin 2 hrs. after inoculation and again 12 days later | 2/7 | 2/7 | 2/7 | 2/7 | 2/7 | 2/7 | 613 |
| Spotted wilt virus on tomatoes: | | | | | | | |
| 0 untreated controls | 8/8 | 8/8 | 8/8 | 8/8 | 8/8 | 8/8 | 213 |
| 100 p.p.m. crude cytovirin 2 hrs. after inoculation and again after 12 days later | 2/8 | 2/8 | 2/8 | 2/8 | 2/8 | 2/8 | 506 |

These results show that spraying crude cytovirin two hours after inoculation and again 12 days later, prevented the development of tobacco mosaic virus and spotted wilt virus in most of the treated tobacco and tomato plants for as long as 7 weeks. The effect of cytovirin in preventing stunting caused by these two virus diseases was remarkable. The two treated plants in each case that became diseased in 14 days showed symptoms before the second spray was applied at 12 days.

*Activity of Crystalline Cytovirin Monohydrochloride on Systemic Virus Infections in Plants*

Crystalline cytovirin monohydrochloride was tested against systemic virus infection to determine whether it had the same antiviral activity as the crude cytovirin. A spray of 10 p.p.m. of crystalline cytovirin in water was applied to tomato plants 6–7 inches high one day after inoculating them with spotted wilt virus. Seven control plants were inoculated but were not sprayed.

RATIO OF NUMBER OF PLANTS SHOWING SPOTTED WILT VIRUS SYMPTOMS TO NUMBER OF PLANTS IN TREATMENT

| Spray Treatment | 17 days | 26 days |
|---|---|---|
| 0 untreated controls | 5/7 | 5/7 |
| 10 p.p.m. crystalline cytovirin hydrochloride 1 day after inoculation | 0/8 | 0/8 |

A spray of 10 p.p.m. crystalline cytovirin was slightly toxic to the plants but it protected all of the treated plants from the virus in this experiment for as long as 26 days. The 5 untreated plants that showed symptoms were killed by the spotted wilt virus in 26 days, while the cytovirin treated plants were still healthy.

More experiments were run in which crystalline cytovirin monohydrochloride was tested against systemic plant viruses. Some of the plants that were inoculated with virus and sprayed with an aqueous solution of crystalline cytovirin were tested to see if they contained infective virus particles. The results are shown in the following tables.

RATIO OF THE NUMBER OF PLANTS SHOWING VIRUS SYMPTOMS TO THE NUMBER OF PLANTS IN THE TREATMENT

| Spray Treatment | Days After Inoculation | | | | |
|---|---|---|---|---|---|
| | 7 | 21 | 28 | 35 | 42 |
| Tobacco mosaic virus in tobacco plants: | | | | | |
| 0 untreated controls | 9/10 | 10/10 | 10/10 | 10/10 | 10/10 |
| 5 p.p.m. crystalline, cytovirin monohydrochloride, 1 day before inoculation and again 1 week later | 0/10 | 0/10 | 3/10 | 5/10 | 6/10 |
| Spotted wilt virus in tomato: | | | | | |
| 0 untreated controls | 6/7 | 7/7 | 7/7 | | |
| 5 p.p.m. crystalline, cytovirin monohydrochloride, 1 day before inoculation and again 1 week later | 0/7 | 1/7 | 6/7 | | |

Spraying tobacco plants one day before inoculation and again one week later gave good protection against tobacco mosaic virus for three weeks and protected half the plants for four weeks. The leaves of four of these symptom-free cytovirin treated plants were ground up four weeks after inoculation; the juice was expressed and tested for infective virus by the local lesion assany on *N. rustica* plants. Leaves of treated plants contained no infective virus (no lesions), whereas the control plants contained high amounts of infective virus (more than 400 lesions per leaf). This experiment shows that the antiviral agent cytovirin is not simply suppressing tobacco mosaic virus symptoms on the plants but is actually inhibiting virus multiplication and in some cases seems to eradicate the virus from the plant.

Symptoms of spotted wilt virus were delayed for two weeks by the cytovirin treatment before inoculation, but most of the plants developed symptoms in three weeks.

The results of three more tests in which crystalline cytovirin was tested against three systemic virus infections are reported below. These tests included a third virus—southern bean mosaic which is systemic in Stringless Green Refugee Bean plants.

RATIO OF NUMBER OF PLANTS SHOWING VIRUS SYMPTOMS TO NUMBER OF PLANTS IN THE TREATMENT

| Spray Treatment | Days after Inoculation | | | | | |
|---|---|---|---|---|---|---|
| | 7 | 13 | 16 | 22 | 29 | 38 |
| Tobacco mosaic virus in tobacco plants: | | | | | | |
| 0 untreated controls | 10/10 | 10/10 | 10/10 | 10/10 | 10/10 | 10/10 |
| 5 p.p.m. crystalline cytovirin monohydrochloride 1 day before inoculation and again 1 week later | 0/10 | 3/10 | 4/10 | 4/10 | 5/10 | 10/10 |
| Spotted wilt virus in tomato: | | | | | | |
| 0 untreated controls | | 9/9 | 9/9 | 9/9 | 9/9 | 9/9 |
| 5 p.p.m. crystalline cytovirin monohydrochloride 1 day after inoculation, 5 days later and again next week | 0/0 | 1/9 | 1/9 | 1/9 | 2/9 | 2/9 |

RATIO OF NUMBER OF PLANTS SHOWING VIRUS SYMPTOMS TO NUMBER OF PLANTS IN THE TREATMENT

| Spray Treatment | Days After Inoculation | |
|---|---|---|
| | 13 | 38 |
| Southern Bean mosaic virus in Stringless Green Refugee Beans: | | |
| 0 untreated controls | 7/7 | 7/7 |
| 5 p.p.m. crystalline cytovirin, monohydrochloride 1 day before inoculation and again 1 week later | 0/8 | 0/4 |
| 5 p.p.m. crystalline cytovirin, monohydrochloride 1 day after inoculation and again 5 days later | 0/7 | 0/4 |

In the case of beans, it was difficult to distinguish the systemic virus symptoms, so the leaves were ground up and the juice was expressed and assayed for virus activity by the local lesion test.

2 weeks after inoculation of the test plants, the undiluted juice from each of 7 untreated control plants produced over 200 lesions per leaf. Juice from each of the 8 plants treated with cytovirin did not produce any local lesions. These results indicate very good protection against systemic infection by southern bean mosaic virus and, in fact, the virus appeared to be eradicated.

In the case of spotted wilt virus, spraying cytovirin one day after inoculation and twice more gave very good protection.

EXAMPLE 6

*Cytosine From Cytovirin by Acid Hydrolysis*

A solution of 65 mg. of cytovirin hydrochloride in 3 ml. of 6 N hydrochloric acid was heated on the steam bath for 16 hours. A black insoluble precipitate formed. The black precipitate was separated from the reaction mass. The supernatant liquid was evaporated to dryness in vacuo. The resulting crystalline residue was dissolved in methanol and one drop of pyridine was added. This solution was then evaporated to dryness in vacuo and the resulting crystalline residue triturated with three 0.5 ml. portions of methanol. The remaining crystalline material was recrystallized two times from water. The yield of this crystalline compound was 6 mg. It had a melting point of 310–315° C. with decomposition occurring at this temperature range.

The ultraviolet and infrared absorption spectra were identical with those of cytosine.

EXAMPLE 7

*Amino Acid From Cytovirin by Acid Hydrolysis*

A solution of one gram of cytovirin monohydrochloride in 20 ml. of 6 N hydrochloric acid was heated on the steam bath for sixteen hours. A black insoluble material formed and then was separated from the solution. The solution was evaporated to dryness in vacuo. The resulting residue was dissolved in water and the solution evaporated to dryness in vacuo. The residue was dissolved in 10 ml. of water and ammonium hydroxide added to give an approximately pH 7-8 solution. The precipitated cytosine was separated from the solution. The solution was then passed through a column of IRC-50 resin on the $NH_4^+$ cycle. The column was washed with 300 ml. of water and then with 50 ml. of N ammonium hydroxide. The ammonium hydroxide solution was evaporated to dryness in vacuo. The resulting residue was dissolved in 5 ml. of 0.1 N hydrochloric acid. The resulting solution was evaporated to dryness in vacuo. The residue was dissolved in methanol and chloroform was added to the solution until faint cloudiness appeared. After a few minutes crystallization began and was essentially complete after three hours. The amino acid crystallizes as a dihydrochloride in the form of needles, M.P. 195-200°. Two additional recrystallizations did not change the appearance or melting point. The yield was 34.5 mg.

The amino acid is optically active, $[\alpha]_D^{23} +14.5$ (c., 1.5 in water).

It has the empirical formula $C_7H_{16}N_4O_2 \cdot 2HCl$.

EXAMPLE 8

*Mild Alkaline Hydrolysis of Cytovirin to Cytoviridine*

A solution of 1 gm. of cytovirin in 10 ml. of N sodium hydroxide was allowed to stand at about 25° for a period of seven days. The solution was then carefully acidified with dilute hydrochloric acid and at a pH 4-5 crystallization of cytoviridine began. After about one hour, the crystalline cytoviridine hydrochloride was separated by centrifuging, washed with two 1-ml. portions of cold water and dried. The yield was 190 mg. The product after recrystallization from 5 ml. of hot water decomposed at ca. 235°, first darkening at ca. 195°.

Cytoviridine hydrochloride was found to have the empirical formula $C_{10}H_{12}N_4O_4 \cdot HCl$. It is optically active having $[\alpha]_D^{23}$ of $-38°$ in water and $[\alpha]_D^{23}$ of $+28°$ in NaOH.

The ultraviolet absorption spectrum of an approximately pH 2 solution showed a single maximum at 275-276 m$\mu$, $E_{1cm}^{1\%}$ 432 minimum at 240 m$\mu$, $E_{1cm}^{1\%}$ 247

Cytoviridine does not react with periodate or hydroxylamine at a temperature of about 25° C.

Microacetylation of cytoviridine indicates the formation of diacetyl cytoviridine with an ultraviolet absorption maximum in acid solution at 302 m$\mu$, $E_{1cm}^{1\%}$ 384

We claim:

1. A compound selected from the group consisting of cytovirin and salts thereof, said cytovirin containing carbon, hydrogen, nitrogen and oxygen and having the molecular formula $C_{17}H_{24-28}N_8O_5$, said compound having one $$-\overset{|}{N}-CH_3$$

group, at least one —NH$_2$ group, one $$-\overset{O}{\underset{||}{C}}-\overset{|}{N}H$$

group and one $$-\overset{NH_2}{\underset{|}{C}}=NH$$

group, said compound being a crystalline substance which on acid hydrolysis yields an acid degradation product, cytosine, having an empirical formula $C_4H_5N_3O$, and an amino acid having the empirical formula $C_7H_{16}N_4O_2$ and on basic hydrolysis yields a substituted cytosine and the amino acid obtained by acid hydrolysis; a solution of substantially pure cytovirin in 0.01 N aqueous sodium hydroxide exhibiting a characteristic maximum ultra-violet absorption peak at about 2680 A.

($E_{1cm}^{1\%}$ 200)

the value of $E_{1cm}^{1\%}$ being indicative of substantially pure material, and a characteristic minimum ultra-violet absorption peak at about 2500 A.

($E_{1cm}^{1\%}$ 140)

a solution of pure cytovirin in 0.01 N hydrochloric acid exhibiting a characteristic maximum ultra-violet absorption peak at about 2750 A.

($E_{1cm}^{1\%}$ 304)

the value of $E_{1cm}^{1\%}$ being indicative of substantially pure material and a characteristic minimum ultra-violet absorption peak at about 2400 A.

($E_{1cm}^{1\%}$ 41)

a mineral oil suspension of substantially pure cytovirin exhibiting characteristic infra-red absorption peaks at the following wavelengths expressed in microns:

| | |
|---|---|
| 2.95–3.2$\mu$ | 8.10 |
| 5.93 | 8.32 |
| 6.01 | 8.41 |
| 6.18 | 8.85 |
| 6.36 | 9.22 |
| 6.51 | 9.50 (shoulder) |
| 6.68 | 9.98 |
| 7.04 | 10.51 |
| 7.16 | 10.78 (shoulder) |
| 7.39 | 11.50 |
| 7.69 | 12.02 |
| 7.77 | 12.60 |
| 7.83 | | the monohydrochloride of cytovirin being a crystalline substance being optically active with $[\alpha]_D^{23}$ $+85°$ (C., 0.077 in water), $[\alpha]_D^{23}$ $+40°$ (C., 0.071 in dilute hydrochloric acid) and $[\alpha]_D^{23}$ $+82°$ (C., 0.058 in a solution having a pH of approximately 11); potentiometric titration of said cytovirin monohydrochloride with an aqueous solution of lithium hydroxide giving an equivalent weight of said cytovirin monohydrochloride of about 456, giving a pH$_1$ ½ of 4.3 and giving a pH$_2$ ½ of 7.9; potentiometric titration of said cytovirin monohydrochloride in 6% aqueous formaldehyde solution with an aqueous solution of lithium hydroxide giving an equivalent weight of said cytovirin monohydrochloride of about 474 and giving a pH ½ of about 5.8, and a mineral suspension of said cytovirin monohydrochloride exhibiting charactiristic infrared absorption peaks at the following wavelengths, expressed in microns:

| | |
|---|---|
| 3.04$\mu$ (shoulder) | 8.88 |
| 3.18 | 9.26 |
| 5.98–6.04 | 9.5 |
| 6.18 | 9.80 (shoulder) |
| 6.28 | 10.10 |
| 6.52 | 10.46 |
| 7.76 | 11.50 |
| 8.11 | 12.08 |
| 8.34 | 12.59 |
| 8.64 | 12.82 | said cytovirin being soluble in H$_2$O, aqueous solutions and alkali metal hydroxides, aqueous and methanolic solutions of mineral acids, lower acidified alkanols and acetic acid, and sparingly soluble in ether, benzene, chloroform and carbon tetrachloride.

2. The monohydrochloride salt of the cytovirin of claim 1.

3. The polyhydrochloride salt of the cytovirin of claim 1.

4. The picrate salt of the cytovirin of claim 1.

5. A plant antiviral composition comprising an inert carrier having intimately mixed therewith a compound of claim 1.

6. A plant antiviral composition comprising an inert carrier having intimately mixed therewith a compound of claim 1 and a wetting agent.

7. The process for the production of cytovirin that comprises growing a culture of a cytovirin-producing strain of *Streptomyces olivochromogenus* var. *cytovirinus* in an aqueous nutrient medium under submerged aerobic conditions to form cytovirin in the culture broth.

8. The process for the production of cytovirin that comprises growing a culture of a cytovirin-producing strain of *Streptomyces olivochromogenus* var. *cytovirinus* in an aqueous nutrient medium under submerged aerobic conditions to form cytovirin in the culture broth, separating the culture broth from the organism growth and recovering cytovirin from the culture broth.

9. The process for the production of cytovirin that comprises growing a culture of a cytovirin-producing strain of *Streptomyces olivochromogenus* var. *cytovirinus* in an aqueous nutrient medium, at an incubation temperature in the range of 22° C. up to 28° C. under submerged aerobic conditions to form cytovirin in the culture broth, separating the culture broth from the organism growth, contacting the broth with an ion-exchange resin to adsorb the cytovirin therefrom, separating cytovirin from the resin by eluting with dilute acid in which cytovirin is soluble and recovering cytovirin therefrom.

10. The process for the production of cytovirin that comprises growing a culture of a cytovirin-producing strain of *Streptomyces olivochromogenus cytovirinus* in an aqueous nutrient medium at an incubation temperature in the range of 22° C. up to 28° C. under submerged aerobic conditions to form cytovirin in the culture broth, separating the culture broth from the organism growth, contacting the broth with alumina to adsorb cytovirin therefrom, separating cytovirin from the alumina by eluting with water in which cytovirin is soluble and recovering cytovirin therefrom.

References Cited in the file of this patent

Fukunaga et al.: Bull. Agr. Chem. Society, Japan, vol. 19, No. 3, July 1955, pp. 181–188.

Takeuchi et al.: J. Antibiotics, Ser. A., January 1958, pp. 1–5.